(12) United States Patent
Malti et al.

(10) Patent No.: US 10,083,524 B1
(45) Date of Patent: Sep. 25, 2018

(54) SYSTEMS AND METHODS FOR DETERMINING LOCATION AND ORIENTATION OF A CAMERA

(71) Applicant: Octi, Los Angeles, CA (US)

(72) Inventors: Abed Malti, Los Angeles, CA (US); Justin Fuisz, Los Angeles, CA (US)

(73) Assignee: Octi, Los Angeles, CA (US)

( * ) Notice: Subject to any disclaimer, the term of this patent is extended or adjusted under 35 U.S.C. 154(b) by 0 days.

(21) Appl. No.: 15/958,155

(22) Filed: Apr. 20, 2018

Related U.S. Application Data

(60) Provisional application No. 62/488,344, filed on Apr. 21, 2017.

(51) Int. Cl.
  *G06K 9/00* (2006.01)
  *G06T 7/73* (2017.01)
  *G06T 13/40* (2011.01)
  *G06T 7/246* (2017.01)

(52) U.S. Cl.
  CPC .............. *G06T 7/74* (2017.01); *G06T 7/248* (2017.01); *G06T 13/40* (2013.01); *G06T 2207/30244* (2013.01)

(58) Field of Classification Search
  CPC ........... G06T 7/74; G06T 7/248; G06T 13/40; G06T 2207/30244
  See application file for complete search history.

(56) References Cited

U.S. PATENT DOCUMENTS

| | | | | |
|---|---|---|---|---|
| 5,699,444 A | * | 12/1997 | Palm | G01C 11/06 382/106 |
| 9,317,741 B2 | * | 4/2016 | Guigues | G06K 9/00342 |
| 9,898,742 B2 | * | 2/2018 | Higgins | G06T 17/00 |
| 2012/0218395 A1 | * | 8/2012 | Andersen | G06F 3/017 348/77 |
| 2016/0216690 A1 | * | 7/2016 | Kim | G03H 1/0808 |

* cited by examiner

*Primary Examiner* — Shefali Goradia
(74) *Attorney, Agent, or Firm* — Goodwin Procter LLP

(57) ABSTRACT

Methods and supporting systems calculate a three-dimensional orientation of a camera based on images of objects within the cameras field of view. A camera (such as a camera within a mobile phone), captures two-dimensional video content including a human body and at least one additional object and assigns a frame of the video content at a first time as an anchor frame. The human body within the anchor frame is modeled by assigning points of movement to a set of body elements. A subsequent frame of the video content is received in which the human body has moved, and a translation function is derived that calculates the three-dimensional position of each of the body elements based on two dimensional movements of the body elements between the anchor frame and the subsequent frame. Using the translation function, a three-dimensional relationship of the camera and the additional object is calculated.

20 Claims, 3 Drawing Sheets

SYSTEMS AND METHODS FOR DETERMINING LOCATION AND ORIENTATION OF A CAMERA

CROSS-REFERENCE TO RELATED APPLICATIONS

This application claims priority to and the benefit of U.S. Provisional Patent Application Ser. No. 62/488,344, filed on Apr. 21, 2017, the entire disclosure of which is incorporated herein by reference.

FIELD OF THE INVENTION

The subject matter of this application relates generally to techniques for determining spatial orientation of objects, and, more specifically, to computing a generalized coordinate system that facilitates enhanced media displays.

BACKGROUND

Cameras, including video cameras, have become ubiquitous in today's society. With the introduction of cameras into mobile phones, and the explosion of social media applications with which one can share content, consumers have effectively become real-time producers of content for the world to see. Applications such as Snapchat, Instagram, and others use user-generated content such as pictures and video as a basis for messages "stories" that are shared among the application community.

To attract and retain users, these applications must continually add new features and effects. Certain effects, such as combining and manipulating video content, however can introduce computationally intensive processing requirements, and, in many cases, result in poor quality.

SUMMARY OF THE INVENTION

The invention provides the techniques and systems that allow for the accurate location of the camera within a scene (referred to as a "global camera position") without the need for multiple cameras or specialized equipment. As a result, image sequences can be created that contain various effects, graphical assets, animations, and other assets from an initial two-dimensional image while maintaining the spatial integrity and relationships among objects in the image sequence. By providing an accurate global position of the camera within the scene, accurate augmented and mixed reality image sequences can be created. The techniques described herein determine a "global position" of the camera within the scene which in turn results in a three-dimensional understanding of the scene.

Unlike conventional methods where occlusion of the anchor/reference points or leaving the scene prohibits the continued tracking of the environment, the technique described herein effects can continued to be rendered accurately as long as the person is in the frame. As a result, users can, for example, render three-dimensional objects and effects within the scene and freely "move" around them in the video sequences, create fully immersive augmented reality scenes, interact within a scene with various objects and other people within a given scene, create "games" in which the spatial relationships among people, real objects, and rendered objects are used within a given image sequence, and create a new form of communication within video sequences using three dimensionally rendered objects.

In each instance these results can be achieved using a single, two-dimensional camera and eliminating the need for specialized camera equipment or multiple cameras.

Therefore, in a first aspect, the invention provides a method to calculate a three-dimensional orientation of a camera based on images of objects within the cameras field of view. The method includes capturing, at a camera (such as a camera within a mobile phone), two-dimensional video content including a human body and at least one additional object and assigning a frame of the video content at a first time as an anchor frame, and the human body within the anchor frame is modeled by assigning points of movement to a set of body elements. A subsequent frame of the video content is received in which the human body has moved, and a translation function is derived that calculates the three-dimensional position of each of the body elements based on two dimensional movements of the body elements between the anchor frame and the subsequent frame. Using the translation function, a three-dimensional relationship of the camera and the additional object is calculated.

In some embodiments, the set of body elements comprises fifteen body elements, such as ankles, elbows, wrists, knees, head, hips etc. In some cases, each point of movement has at least three degrees of freedom, and in some cases up to six. In certain implementations, a first set of the points of movement have fewer degrees of freedom than a second set of the points of movement, based, for example, on skeletal limitations associated with each point of movement. Modeling the human body within the anchor frame may, in some cases, comprise expressing the three dimensional location of each body element as a function of the three dimensional location of each of the other body elements. In some embodiments, modeling the human body within the anchor frame also includes providing a limb length for adjacent body elements.

In some embodiments, the translation relates movements in a first two dimensional plane to movements in another two dimensional plane, and may include a relational component and a translational component.

In another aspect, embodiments of the invention provide a system for calculating a three-dimensional orientation of a camera based on images of objects within the cameras field of view. The system includes at least one memory storing computer-executable instructions and at least one processing unit for executing the instructions stored in the memory. Execution of the instructions results in one or more application modules for providing an application for execution on a mobile device. When executed, the application captures, at a camera (such as a camera within a mobile phone), two-dimensional video content including a human body and at least one additional object and assigning a frame of the video content at a first time as an anchor frame, and models the human body within the anchor frame by assigning points of movement to a set of body elements. A subsequent frame of the video content is received in which the human body has moved, and a translation function is derived that calculates the three-dimensional position of each of the body elements based on two dimensional movements of the body elements between the anchor frame and the subsequent frame. Using the translation function, a three-dimensional relationship of the camera and the additional object is calculated.

In some embodiments, the set of body elements comprises fifteen body elements, such as ankles, elbows, wrists, knees, head, hips etc. In some cases, each point of movement has at least three degrees of freedom, and in some cases up to six. In certain implementations, a first set of the points of movement have fewer degrees of freedom than a second set of the points of movement, based, for example, on skeletal limitations associated with each point of movement. Modeling the human body within the anchor frame may, in some cases, comprise expressing the three dimensional location of each body element as a function of the three dimensional location of each of the other body elements. In some embodiments, modeling the human body within the anchor frame also includes providing a limb length for adjacent body elements.

In some embodiments, the translation relates movements in a first two dimensional plane to movements in another two dimensional plane, and may include a relational component and a translational component.

BRIEF DESCRIPTION OF THE DRAWINGS

Advantages of the some embodiments may be understood by referring to the following description taken in conjunction with the accompanying drawings. In the drawings, like reference characters generally refer to the same parts throughout the different views. Also, the drawings are not necessarily to scale, emphasis instead generally being placed upon illustrating principles of some embodiments of the invention.

DETAILED DESCRIPTION

Figure 1:
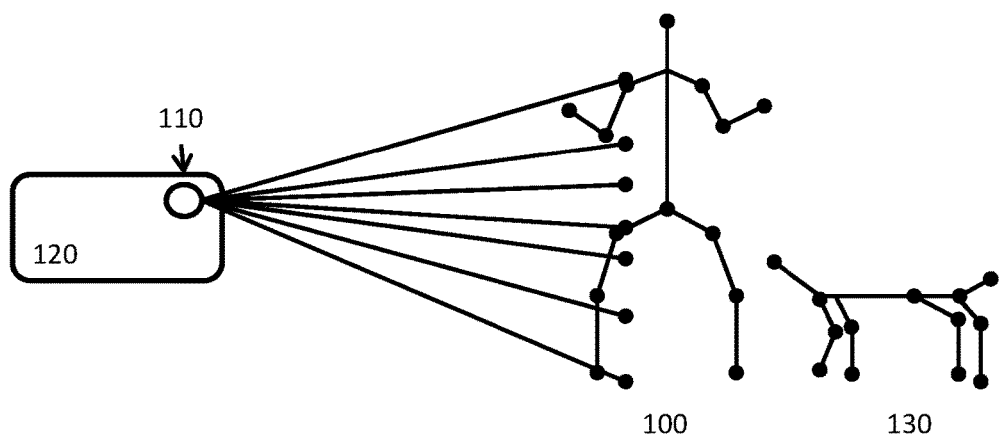
FIG. 1 is an illustrative environment in which various embodiments of the invention may be implemented.

As a basis to compute a global position a video sequence is taken of a body in motion. FIG. 1 illustrates a human body 100 with various body elements as points of potential movement identified. Each point is mapped using three measurements—degree of freedom (DoF), angular rotation (R) and lateral translation (T). Because each body element's movement may be limited based on its physical attachment to other elements or its physiology the degrees of freedom allocated to each body element may differ. For example, an elbow may only have one rotational degree of freedom based on the elbow's skeletal structure and its translational movement may be limited by or related to the translational movement of the shoulder on the same side. A camera, 110, may be used to capture photographs and/or video of the body 100. In many instances, the camera 110 is embedded in a mobile device such as a phone 120, such that content captured by the camera 110 can be easily uploaded and shared with others via email, social networks, SMS messaging, etc.

In addition to the body 100 being in the field of view of the camera 110, other objects 130, such as animals, furniture, trees, buildings, etc. may also be in the captured images. Using the techniques described herein, knowledge of how the human body 100 is constructed can be used to model the spatial relationship between the camera 110 and the other objects 130.

Figure 2:
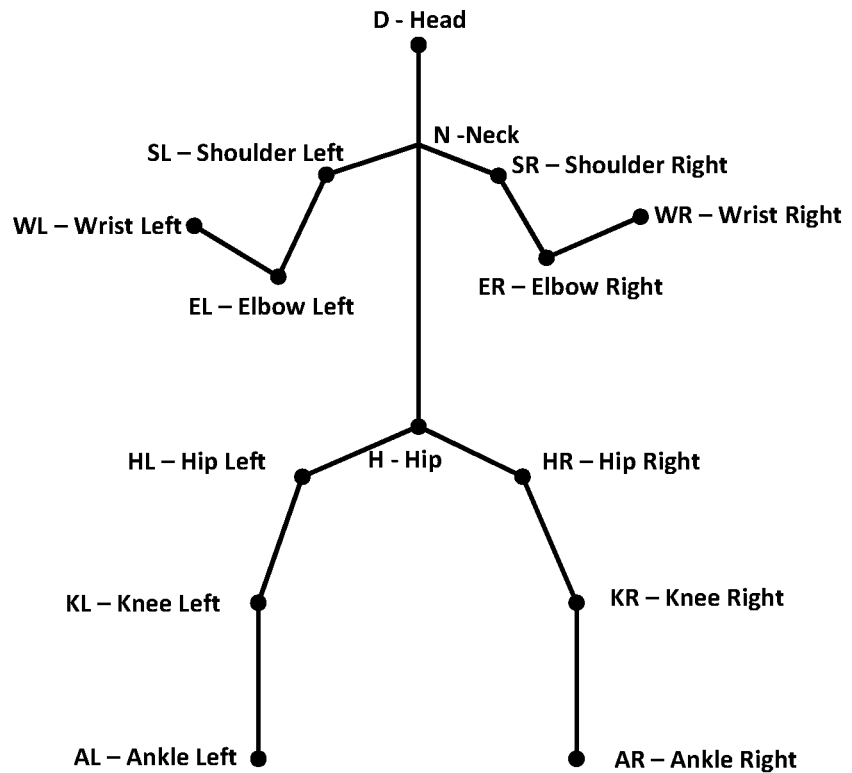
FIG. 2 illustrates a human form with body elements annotated to capture and calculate movement in accordance with various embodiments of the invention.
Figure 3:
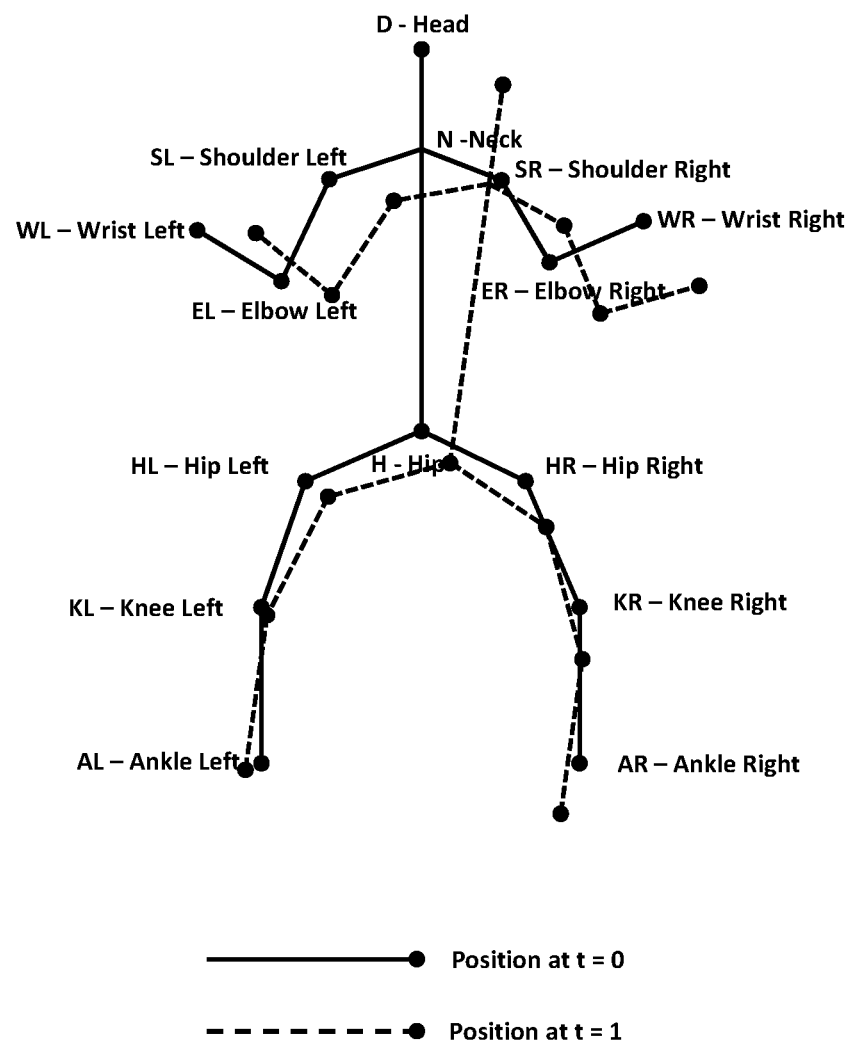
FIG. 3 illustrates the annotated human form of FIG. 1 after movement has been detected.

FIG. 2 below illustrates the same body as it has moved from time=0 to time=1. In this case, the entire body has shifted slightly to the left (translational movement) but certain body elements (the left elbow) has also rotated down slightly.

At the first frame of the video a three-dimensional pose is captured of the target human body and is used as an anchor frame. An incremental kinematic modeling of the body motion is determined using a variation of Cartesian coordinates which are related to a variation of generalized coordinates through the Jacobian of the kinematic model, under an assumption that the overall change of the body posture is slower than the number of frames per second. For instance, if the video was recorded at N fps, it is assumed that every 1/N seconds only a few joints of the body undergo incremental change. Using compressive sensing algorithms, these sparse incremental changes are mapped and, simultaneously, the rotation and translation of the camera motion is estimated. Therefore, the body and the motion of the camera for the entire video sequence can be built with respect to the anchor frame, thus determining the global position of the camera.

Specifically, for body elements with a full range of motion having six degrees of freedom, six degrees of freedom are modeled. For example, for each of the left and right ankle, the position q can be modeled as:

$$q_{AL}:(\theta,\psi,\varphi,t_x,t_y,t_z)_{AL}$$

for the left ankle, and $$q_{AR}:(\theta,\psi,\varphi,t_x,t_y,t_z)_{AR}$$

for the right ankle. Certain body elements can be represented using fewer angular elements due to skeletal limitations, such as elbows and knees, and may be represented:

$$q_{EL}:(\theta,t_x,t_y,t_z)_{AL}$$

for the left elbow, where $\theta$, $\psi$, $\varphi$ represent the Euler angles of each body part describing the orientation of a rigid body with respect to a fixed coordinate system, and tx, ty, tz represent the translational movement of the body part in each of the three dimensions of the coordinate system.

Based on these constraints, the entire body may be modeled using a total of 34 degrees of freedom and summarized as:

$$Q=[q_{AL},q_{AR},q_{HL},q_H,q_{HR},q_{EL},q_{ER},q_{KL},q_{KR},\cdots q_H]\in R^{34}$$

Using Cartesian coordinates, the location and orientation of each body element can be expressed as:

$$\begin{pmatrix} X_{AL} = f_{AL}(Q) \\ X_{AR} = f_{AR}(Q) \\ \cdots \\ X_D = f_D(Q) \end{pmatrix} \in R^{45}: 15 \text{ three } dimensoianl \text{ positions of points}$$

where f is a set of non-linear functions that are concatenations of rigid transformations in three dimensions including rotation and translation:

$$X=[X_{AL},X_{AR}\ldots X_D]\in R^{45}$$

and f may also include the lengths of the different limbs connecting the body elements, resulting in an expression:

$$X=F(Q)$$

of the body's position as determined by X or Q.

Once the body starts moving, its orientation and position becomes function of its prior position and time:

$$X(t)=F(Q(t))$$

and as time progresses the body's position at time t+1 can be expressed as:

$$X(t+dt)=F(Q(t+dt))$$

or $$F(Q(t)) + \frac{dF}{dQ} Q(t+dt) - Q(t)$$

where $$\frac{dF}{dQ}$$

is the Jacobian function J relating infinitesimal areas in one plane of movement to areas in another plane and in this case is a 45×34 matrix and Q(t+dt)−Q(t) can is a 34 element vector dQt.

As seen by the camera, the angular motion of the body can also be presented as a function of a relational component R and a translational component t and expressed generally as:

$$X(t+dt) = (I_{15} \otimes R^c) \times (t) + JdQt + \begin{bmatrix} 1_1 \\ \cdot \\ 1_{15} \end{bmatrix} \otimes t^c$$

where X is a 15×15 matrix (representing the 15 body elements being tracked) and:

$$(I_{15} \otimes R^c) = \begin{bmatrix} R^c & \cdots & 0 \\ \vdots & \ddots & \vdots \\ 0 & \cdots & R^c \end{bmatrix}$$

and $$\begin{bmatrix} 1_1 \\ \cdot \\ 1_{15} \end{bmatrix} \otimes t^c = \begin{bmatrix} r_c \\ \cdot \\ t_c \end{bmatrix} \; 15 \text{ times.}$$

For a weak perspective camera, each pixel can be expressed as:

$$x(t+dt) = \left(1_{15} \otimes \begin{bmatrix} s_x & 0 \\ 0 & s_y \end{bmatrix} \begin{bmatrix} 1 & 0 & 0 \\ 0 & 1 & 0 \end{bmatrix} R \right) X(t) + (I_{15} \otimes t^c) + JdQt$$

Then, solving for R, $S_x$, $S_y$, $t_c$ and d(Q(t)):

$$\min \| dQ(t) \|_1 \xleftarrow{\text{norm } 1}$$

such that $$x = \left(I_{15} \otimes \begin{bmatrix} s_x & 0 \\ 0 & s_y \end{bmatrix} \right) \left( \begin{bmatrix} 1 & 0 & 0 \\ 0 & 1 & 0 \end{bmatrix} R \right) X(t) + (1_{15 \times n} \otimes t^c + J(t)) \quad \text{Equation 1}$$

Minimizing norm1 of d(Q(t)) means that only a few elements of dQ are non-zero. This assumption is valid for cameras having faster frames-per-second (fps) that a human body in motion. Simplifying the solution for R as infinitesimal rotation results in:

$$R = I_3 + \epsilon = \begin{bmatrix} 1 & & \\ & 1 & \\ & & 1 \end{bmatrix} + \begin{bmatrix} 0 & -\gamma & -\beta \\ -\gamma & 0 & \alpha \\ \beta & -\alpha & 0 \end{bmatrix}$$

where $\alpha$, $\beta$ and $\gamma$ are determined by Eq. 1 above.

For reconstruction of the movement timeline, given X(t) and the current projection x(t), and solving Eq. 1 above gives:

$$R(t), t^c(t), d(Q(t)).$$

At t=0, the Varun and Sheikh method is used to obtain X(0), R(0)=I3, tc(0), dQ(0)=0. At t=1 (40 ms from the start of the video), solving Eq. 1 results in dQ(1), R(1), t(1), and the new position is updated as X(1)=R(1)X(0)+tc(1)+JdQ(1) for the next iteration. Generalizing, at t=I and solving Eq. 1→dQ(i), R(i), t(i), and the next position is represented as X(1)=R(i)X(i−1)+tc(i)+JdQ(i). At instant t=end solving Eq. 1 results in dQ(end), R(end), t(end), and the new position is updated as: X(end)=R(end)X(end−1)+tc(i)+JdQ(end) yielding a final result of: X(o), . . . X(i), . . . X(end) three dimensional positions with respect to a unique reference frame, the first frame where the camera was at t=0 and (R(0), tc(0)), . . . (R(end), tc(end)) representing successive rotations (R) and translations (t) of the camera.

Refining the results using a sequential bundle adjustment and minimizing the image distance between reprojected point and detected joints for every view in which the three dimensional joint appears as:

$$\min_{R, t^c, dQ} \sum_{t=0}^{end} \left\| \left( I_{15} \otimes \begin{bmatrix} s_x & 0 \\ 0 & s_y \end{bmatrix} \right) \left( \begin{bmatrix} 1 & 0 & 0 \\ 0 & 1 & 0 \end{bmatrix} R \right) X(t) + (1_{15 \times n} \otimes t^c + JdQ(t) - x(t)) \right\|$$

By tracking and estimating the movement of the body in three dimensions based on a sequence of two dimensional images, and modeling the relationship as a function of time, the camera position can be estimated with respect to other elements in the images, and thus the three dimensional relations of those items can also be estimated and manipulated to implement effects on the other elements.

Method steps of the techniques described herein can be performed by one or more programmable processors executing a computer program to perform functions of the invention by operating on input data and generating output. Method steps can also be performed by, and apparatus of the invention can be implemented as, special purpose logic circuitry, e.g., an FPGA (field programmable gate array) or an ASIC (application-specific integrated circuit). Modules can refer to portions of the computer program and/or the processor/special circuitry that implements that functionality.

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. One or more memories can store media assets (e.g., audio, video, graphics, interface elements, and/or other media files), configuration files, and/or instructions that, when executed by a processor, form the modules, engines, and other components described herein and perform the functionality associated with the components. The processor and the memory can be supplemented by, or incorporated in special purpose logic circuitry.

It should also be noted that the present implementations can be provided as one or more computer-readable programs embodied on or in one or more articles of manufacture. The article of manufacture can be any suitable hardware apparatus, such as, for example, a floppy disk, a hard disk, a CD-ROM, a CD-RW, a CD-R, a DVD-ROM, a DVD-RW, a DVD-R, a flash memory card, a PROM, a RAM, a ROM, or a magnetic tape. In general, the computer-readable programs can be implemented in any programming language. The software programs can be further translated into machine language or virtual machine instructions and stored in a program file in that form. The program file can then be stored on or in one or more of the articles of manufacture.

The invention claimed is:

1. A method to calculate a three-dimensional orientation of a camera based on images of objects within the cameras field of view, the method comprising:
   capturing, at a camera, two-dimensional video content including a human body and at least one additional object;
   assigning a frame of the video content at a first time as an anchor frame;
   modeling the human body within the anchor frame by assigning points of movement to a set of body elements;
   receiving a subsequent frame of the video content in which the human body has moved;
   deriving a translation function that calculates the three-dimensional position of each of the body elements based on two dimensional movements of the body elements between the anchor frame and the subsequent frame; and
   calculating a three-dimensional relationship of the camera and the at least one additional object based on the translation function.

2. The method of claim 1 wherein the camera is contained in a mobile phone.

3. The method of claim 1 wherein the set of body elements comprises fifteen body elements.

4. The method of claim 1 wherein the each point of movement has at least three degrees of freedom.

5. The method of claim 4 wherein a first set of the points of movement have fewer degrees of freedom than a second set of the points of movement.

6. The method of claim 5 wherein the set of points having fewer degrees of freedom is based at least in part on skeletal limitations associated with each point of movement.

7. The method of claim 1 wherein modeling the human body within the anchor frame further comprises expressing the three dimensional location of each body element as a function of the three dimensional location of each of the other body elements.

8. The method of claim 7 wherein the modeling the human body within the anchor frame further comprises providing a limb length for adjacent body elements.

9. The method of claim 1 wherein the translation function relates movements in a first two dimensional plane to movements in another two dimensional plane.

10. The method of claim 9 wherein the translation function comprises a relational component and a translational component.

11. A computerized system for calculating a three-dimensional orientation of a camera based on images of objects within the cameras field of view, the system comprising:
    at least one memory storing computer-executable instructions; and
    at least one processing unit for executing the instructions stored in the memory, wherein execution of the instructions results in one or more application modules for providing an application for execution on a mobile device, wherein the application performs the following functions:
       capturing, at a camera, two-dimensional video content including a human body and at least one additional object;
       assigning a frame of the video content at a first time as an anchor frame;
       modeling the human body within the anchor frame by assigning points of movement to a set of body elements;
       receiving a subsequent frame of the video content in which the human body has moved;
       deriving a translation function that calculates the three-dimensional position of each of the body elements based on two dimensional movements of the body elements between the anchor frame and the subsequent frame; and
       calculating a three-dimensional relationship of the camera and the at least one additional object based on the translation function.

12. The system of claim 11 wherein the camera is contained in a mobile phone.

13. The system of claim 11 wherein the set of body elements comprises fifteen body elements.

14. The system of claim 11 wherein the each point of movement has at least three degrees of freedom.

15. The system of claim 14 wherein a first set of the points of movement have fewer degrees of freedom than a second set of the points of movement.

16. The system of claim 15 wherein the set of points having fewer degrees of freedom is based at least in part on skeletal limitations associated with each point of movement.

17. The system of claim 11 wherein modeling the human body within the anchor frame further comprises expressing the three dimensional location of each body element as a function of the three dimensional location of each of the other body elements.

18. The system of claim 17 wherein the modeling the human body within the anchor frame further comprises providing a limb length for adjacent body elements.

19. The system of claim 11 wherein the translation function relates movements in a first two dimensional plane to movements in another two dimensional plane.

20. The system of claim 19 wherein the translation function comprises a relational component and a translational component.

\* \* \* \* \*